M. J. O'CONNOR.
VEHICLE WHEEL.
APPLICATION FILED APR. 24, 1919. RENEWED MAR. 6, 1920.
1,378,823.
Patented May 17, 1921.
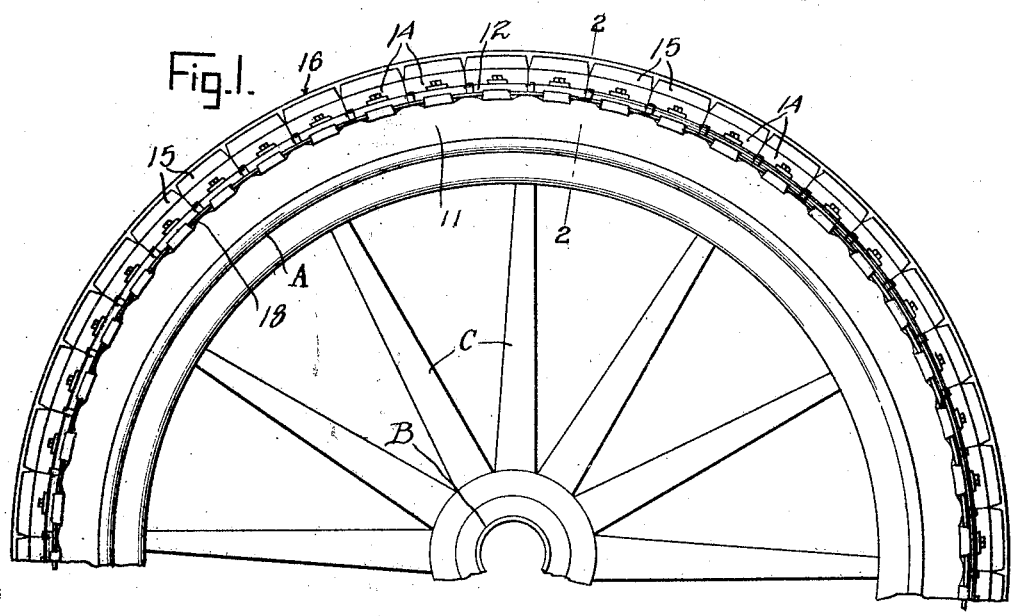
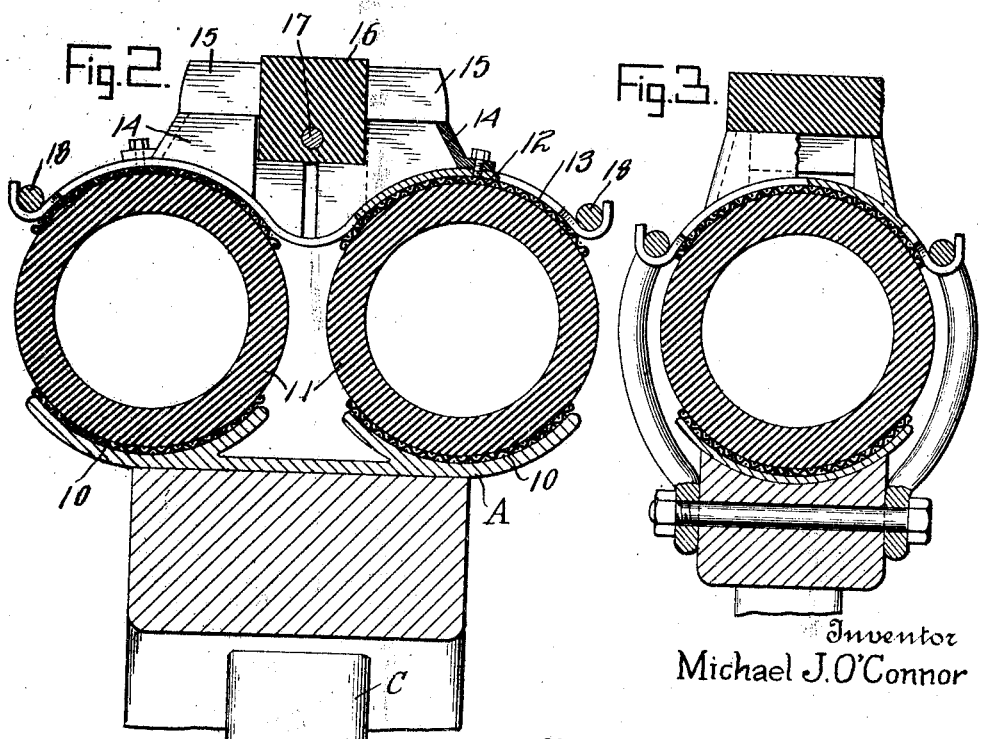
Inventor
Michael J. O'Connor
By E. W. Bradford
Attorney

UNITED STATES PATENT OFFICE.

MICHAEL J. O'CONNOR, OF BLOOMINGDALE, NEW JERSEY.

VEHICLE-WHEEL.

1,378,823. Specification of Letters Patent. Patented May 17, 1921.

Application filed April 24, 1919, Serial No. 292,451. Renewed March 6, 1920. Serial No. 363,665.

*To all whom it may concern:*

Be it known that I, MICHAEL J. O'CONNOR, a citizen of the United States, residing at Bloomingdale, in the county of Passaic and State of New Jersey, have invented certain new and useful Improvements in Vehicle-Wheels, of which the following is a specification.

My said invention consists in various improvements in the construction of pneumatic tires for vehicle wheels, the object being to provide a tire wherein all the advantages of a pneumatic tire are secured and the danger of puncturing from ordinary use is avoided, all as will be hereinafter more fully described and claimed.

Referring to the accompanying drawings which are made a part hereof and on which similar reference characters represent similar parts, Figure 1 is a side elevation of a portion of a wheel fitted with my improved tire, Fig. 2, a cross section taken on the line 2—2 of Fig. 1, and Fig. 3, a cross section through a modified form of the tire.

In said drawings the portions marked A represent the rim, B the hub, and C the spokes of the wheel.

The rim A is provided with two pneumatic tube seats 10 on which are mounted the pneumatic tubes 11. On the outside surface of said tubes is mounted an annular jointed frame 12, a canvas protecting member 13 being preferably interposed between the surface of the tube and the frame.

Said frame 12 consists of segmental members with alined curved recesses to receive the tubes and forming a substantially continuous recess normally concentric with the seats 10 and having projecting annular pockets 14 in both of which are mounted a pair of tread members 15. Between said tread members 15 is mounted an annular member 16 built up of rubber or other composition in which is preferably embedded a wire or steel ring 17.

By this means a tread is provided for the tire which has strong tractive advantages and at the same time presents a practically solid tread to the pavement, thus preventing puncture from any accidental cause, and also providing a tire that is capable of long wear and thus avoids expense of frequent renewal.

The frame segments 12 may be secured around and upon the tubes 11 by binding rings 18, although these may not be found necessary.

In Fig. 3 I show a modified form in which a single tube is employed in lieu of a double tube. I prefer the multiple tube structure but it may be found that the single tube will be useful under some conditions.

Having thus fully described my said invention, what I claim as new and desire to secure by Letters Patent, is:

1. A pneumatic tire for wheels comprising an inner rim having parallel recesses, a plurality of pneumatic tubes mounted in said recesses, an outer rim having similar parallel recesses, pockets formed on the periphery of said outer rim, blocks located in said pockets, and a central circular tread located between said blocks, substantially as set forth.

2. A pneumatic tire for wheels comprising an inner rim having parallel recesses, pneumatic tubes mounted in said recesses, an outer rim having recesses confining said tubes, pairs of pockets formed on the periphery of said outer rim, detachable dovetailed blocks seated in said pockets, and a circumferential tread located between said blocks, substantially as set forth.

3. A tire for wheels comprising an inner rim having circumferential recesses, tubes mounted in said recesses, an outer rim composed of segments having alined circumferential recesses confining said tubes, corresponding pairs of dovetailed pockets formed on the periphery of said outer rim, detachable dovetailed blocks seated in said pockets and a circumferential tread confined between the said blocks, substantially as set forth.

4. A resilient tire for wheels comprising a plurality of pneumatic tires supported on a rim, a plurality of circumferentially alined segments located about the outer periphery of said tires and serving to hold them in relative position, a tread carried by said segments comprising individual wear members and a continuous element for holding said segments in place, and means connecting the outer ends of said segments and coacting with said element to hold said segments in place, substantially as set forth.

In witness whereof, I have hereunto set my hand and seal at Washington, District of Columbia, this twenty-second day of April, A. D. nineteen hundred and nineteen.

MICHAEL J. O'CONNOR. [L. S.]

Witnesses:
E. W. BRADFORD,
E. K. REICHENBACH.